Figure 1:
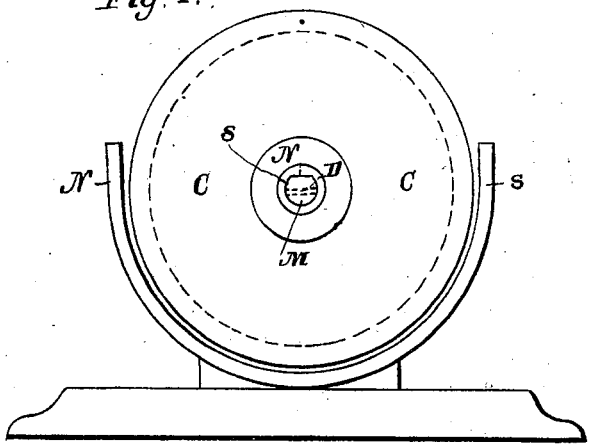
Figure 2:
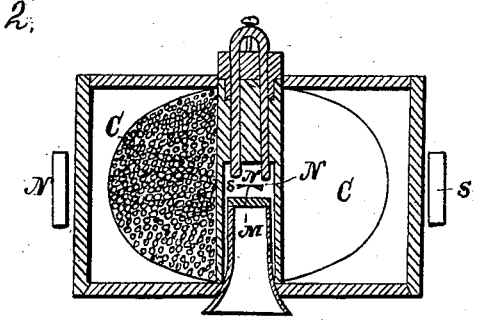
Figure 3:
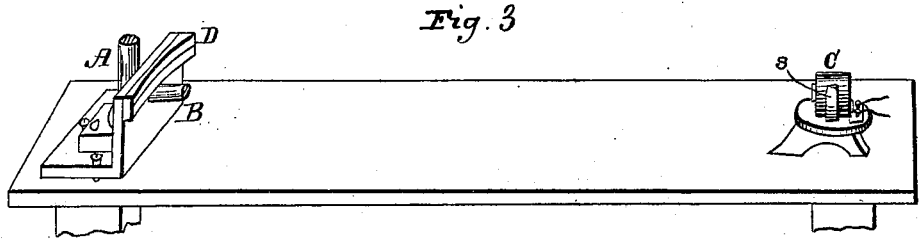

W. THOMSON.
Electric Telegraph.

No. 92,228.

Patented July 6, 1869.

Witnesses:

Inventor:

UNITED STATES PATENT OFFICE.

WILLIAM THOMSON, OF GLASGOW COLLEGE, SCOTLAND.

IMPROVEMENT IN REFLECTING GALVANOMETERS.

Specification forming part of Letters Patent No. 92,228, dated July 6, 1869.

*To all whom it may concern:*

Be it known that I, WILLIAM THOMSON, of Glasgow College, Scotland, have invented certain new and useful Improvements in Electric Telegraphs; and I hereby declare that the following is a full, clear, and exact description thereof, reference being made to the accompanying drawings, making part of this specification.

My invention relates to the application of a certain form of reflecting galvanometer as a receiving-instrument in connection with long submarine cables and analogous telegraphic circuits.

The ordinary detecter or galvanometer has long been in use as a receiving-instrument on land-lines, but is not adapted for use on circuits comprising long submarine cables, first, because it is not sensitive enough to indicate the feeble currents which it is desirable to use; second, because the weight and inertia of the moving parts are so great that the needle moves in beats or pulsations, and cannot follow the continually-varying strengths of current always received through long submarine cables, and due to inductive retardation, complicated by the effect of preceding signals.

In my invention I obtain the required sensitiveness to very feeble currents by the use of a reflected ray of light. The rays of light from a lamp, A, pass through an aperture, B, in a screen and fall on a small mirror, M, attached to the magnet N suspended inside the coils C. From this mirror the rays are reflected so as to converge and form an image of the flame or spot of light on the scale D. This convergence can be obtained either with a plane mirror and fixed lens, or by making the mirror itself a silvered lens or thin glass of concave form. The weight of the mirror and magnet need not exceed one-third of a grain. A very small angular motion of the suspended magnet, causes the spot of light to travel over a comparatively large extent of the scale, so that a feeble current, causing a deflection of the magnet such as would be barely visible at the end of an ordinary pointer, sends the spot of light a sensible distance along the scale. This arrangement has the second advantage of diminishing the inertia and momentum of the moving parts so much that the spot of light can sensibly follow, in its indications, every variation in the strength of the received current—a peculiarity essential to the rapid and certain reception of signals on submarine lines, even where the signals are, as in the single-needle code of Steinheil, simply right and left hand signals, or are of several different strengths of current, or, as in the Morse code, require but one current maintained for various times.

My instrument gives continuous indications of all variations in the strength of the current through the end of the cable where the message is received, and these indications are interpreted according to the code of signals used, which may be Morse or Steinheil, or dependent on several different degrees of strength and intervals of time.

By the use of my invention rapid signaling with but small battery-power is possible through long submarine circuits, and signals can by its use be, as it were, disentangled and read when they would be illegible on any other instrument hitherto used.

I claim—

1. The reflector M, magnet N, coils or helix C, source of light A, and scale or equivalent receiving-surface D, combined and arranged as described, and adapted to serve relatively to each other and to a telegraphic conductor substantially as and for the purposes herein set forth.

2. The method herein described of rendering visible rapidly-succeeding changes in weak currents through long telegraphic conductors by causing the same to deflect a ray of light, substantially as and for the purposes herein set forth.

In testimony whereof I have hereunto set my name in presence of two subscribing witnesses.

WILLIAM THOMSON, KNT., LL. D.

Witnesses:
ROB. BURGESS,
W. B. H. WILSON.